Oct. 28, 1941.  R. L. BROWNLEE  2,260,770
CLUTCH
Filed Nov. 27, 1939
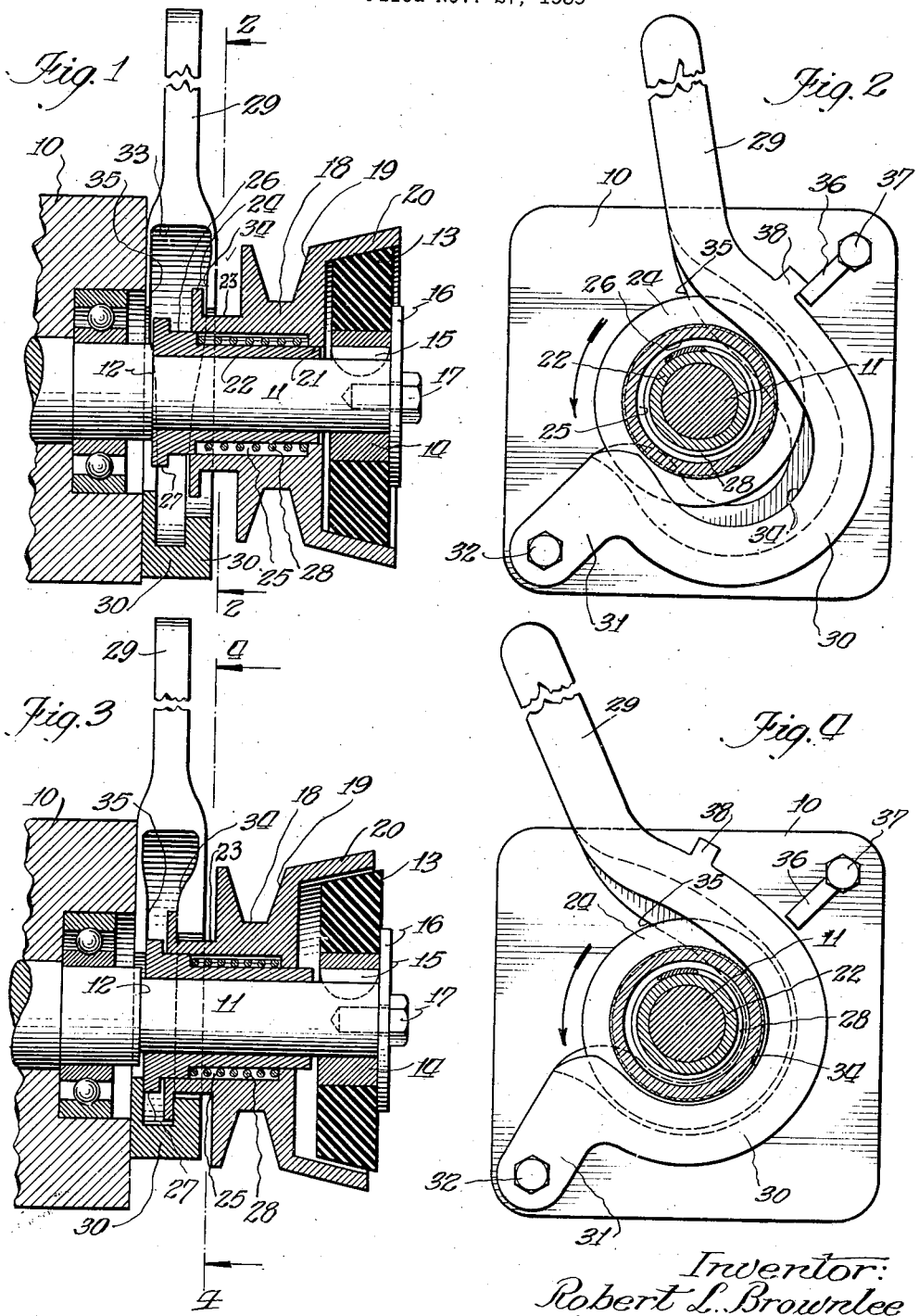
Inventor:
Robert L. Brownlee
By: Stevens & Batchelor
Atty's.

Patented Oct. 28, 1941

2,260,770

UNITED STATES PATENT OFFICE 2,260,770

CLUTCH

Robert L. Brownlee, Chicago, Ill.

Application November 27, 1939, Serial No. 306,362

11 Claims. (Cl. 192—93)

My invention relates to clutches, and more particularly to the mechanism for operating the same, and my main object is to provide a mechanism which eliminates end-thrust in the clutch, whether the same is in the engaged or disengaged position.

A further object of the invention is to provide a clutch whose mechanism requires no lubrication or attention, yet permits the clutch to run at high speeds.

A further object of the invention is to provide a clutch which is self-adjusting in the event of wear.

A still further object of the invention is to design a clutch with a compact and easily controlled mechanism.

Another object of the invention is to build a clutch as a unit which is easily applicable to many forms of running gear.

An additional object of the invention is to include in the clutch means for inducing the smooth and gradual engagement of the same.

An important object of the invention is to construct the novel clutch along lines of simplicity and ruggedness, whereby to render it economical to manufacture and durable over a long period of use.

With the above objects in view and any others which may suggest themselves from the description to follow, a better understanding of the invention may be had by reference to the accompanying drawing, in which—

Fig. 1 is a vertical section of the novel clutch in the engaged position;

Fig. 2 is a section on the line 2—2 of Fig. 1;

Fig. 3 is a view similar to Fig. 1, showing the clutch in the disengaged position; and Fig. 4 is a section on the line 4—4 of Fig. 3.

Generally, friction clutches include a factor of end-thrust. While this factor is not considerable as affecting the power of the running gear, it does affect the speed thereof to some extent on the engagement and disengagement, imposing strains on the running gear which sooner or later weaken or loosen vital elements therein. Another and more apparent disadvantage of end-thrust in friction clutches is the factor of wear in the bearings or shifting mechanism of the clutch, particularly where the drive is at high speed. Proper lubrication relieves this difficulty to a considerable extent, but such care is not often taken, so that in the average case trouble develops frequently and repairs or replacements become necessary. I have therefore departed from the faulty designs of conventional friction clutches by constructing the same with a mechanism which eliminates the disadvantages outlined above.

In accordance with the foregoing, the machine to which the novel clutch is applicable may be an engine 10 whose shaft 11 is formed with a shoulder 12 at the point of issue from the engine. Of course, the clutch may be applicable to any other machine or power source whose motive shaft is formed with a shoulder.

The driving member of the clutch is in the form of a thick disk 13 of rubber or other material which is both substantial and somewhat yieldable. The disk 13 is fast on a collar 14 which is slid on the outer end of the shaft 11 and made fast on the same by means of a key 15. The disk is then secured against outward departure by a plate 16 which is made fast by a bolt 17 screwed into the corresponding end of the shaft.

The driven member of the clutch consists of a solid pulley 18 which may have any peripheral formation, but is preferably made with a flaring groove 19 to receive a V-belt, the latter not being shown. The pulley is positioned inwardly of the disk 13 and is extended with a rim 20 around the periphery of the disk. The said periphery of disc 13 and the rim 20 are designed with matching oblique formations to constitute the assembly as a typical cone clutch, Figs. 1 and 2 showing the same in the engaged position.

The clutch is disengaged to the position indicated in Fig. 3 by retracting the driven member 18 a short distance from the disk 13. The said member is made with a central bore 21 to ride on a bushing 22 during its retraction and advance, the said bushing being freely mounted on the shaft 11. The member 18 is formed with a hub 23 whose rear end is enlarged with an outward circular flange 24. The bore 21 in the member 18 is enlarged toward the rear as indicated at 25 to seat the rear portion of the member around a shoulder 26 developed from the bushing 22; and the latter terminates with a further enlargement in the form of a circular flange 27. Within the bore 25 a compression spring 28 is coiled around the bushing 22.

As the spring 28 exerts a lateral separating influence in axial directions on the member 18 and the bushing 22, the latter is normally urged against the shaft shoulder 12 while the clutch 20 is urged into frictional engagement with the driving disk 13. It follows, therefore, that the retraction of the member 18 will disengage the clutch, and that the slight advance of the bushing 22 towards the driven member 18 will move the bushing away from shaft shoulder 12 and relieve the shaft from the end-thrust thereof as the shaft continues to rotate.

The flange 24 of the member 18 and the flange 27 of the bushing 22 are actuated simultaneously when it is desired to disengage the clutch and procure the incidental release of the shaft 11 as just explained, a lever 29 being operated to gather the flanges.

The lever 29 is formed with a pouch-like medial portion 30 terminating with a foot 31 which is pivoted to the face of the engine or machine 10 by means of a bolt 32. The medial portion of the lever is channeled where it faces the flanges 24 and 27, as indicated at 33, the walls thereof being inwardly thickened to form cams 34 and 35 in respect to the said flanges.

In its engaged position, per Figs. 1 and 2, the lever 29 is free of the flanges 24 and 27 and is retained by a suitable stop device 36 secured by a bolt 37 to the engine or machine, a lug 38 projecting from the lever and resting on the stop 36. The clutch assembly may thus rotate as a unit with the shaft 11 and without interference or hindrance. However, when the lever is swung toward the assembly—as indicated in Figs. 3 and 4, the cams 34 and 35 will gradually engage the flanges 24 and 27 and gather them, accomplishing the disengagement of the clutch and release of the shaft 11. Now the driven parts come to a stop, while the shaft continues its rotation without any end-thrust or other deterring influence.

It is preferable that the lever 29 be applied on that side of the clutch where the advance of the lever will be in harmony with the direction of clutch rotation. This is indicated by arrows in Figs. 2 and 4, and it will be manifest that the engagement of the lever cams will be assisted rather than resisted by the flanges 24 and 27. Also, the cam 34 is considerably thicker than the cam 35, to procure a comparatively long travel for the clutch to fully release it, as against the short movement necessary for the bushing 22 to free it from the shaft shoulder. Yet the design of the cams permits them to function without adjustment in case the clutch or bushing separate slightly from taking up wear. By making the bushing of the self-lubricating alloy known as "Oil-Lite," the assembly will require no lubrication.

With some rubber compounds capable of withstanding considerable frictional heat, the use of the rubber drive disk will impart the advantage of yieldability for gradual clutch engagement without causing burning or deterioration of the disk, particularly during high-speed operation. Further, the absence of end-thrust in the clutch will relieve the power shaft of a checking or dragging influence which is reflected in a drop in speed each time the load is assumed. Finally, it is apparent that the assembly is composed of few parts, which are simple, sturdy and of a nature to be economically manufactured.

While I have described the invention along specific lines, various minor changes and refinements may be made without departing from its principle, and I desire to consider all such changes and refinements as coming within the scope and spirit of the appended claims.

I claim:

1. A clutch, comprising a rotatable driving shaft, a driving clutch member carried by said shaft, a driven clutch member movable into and out of operative engagement with said driving member, an abutment on said shaft, a third member slidable on said shaft between said abutment and driving member, said third member slidably mounting said driven member, means normally effective to urge said driven and third members in opposite directions and into engagement with said driving member and abutment respectively, and actuating means to gather said driven and third members to disengage the same from said driving member and abutment respectively, said actuating means comprising a lever movable relative to said shaft, and cam formations on said lever and engageable with said driven and third members on said movement of the lever to effect said gathering action.

2. A clutch, comprising a rotatable driving shaft, a driving clutch member carried by said shaft, a driven clutch member movable into and out of operative engagement with said driving member, an abutment on said shaft, a third member slidable on said shaft between said abutment and driving member, said third member slidably mounting said driven member, means normally effective to urge said driven and third members in opposite directions and into engagement with said driving member and abutment respectively, and actuating means to gather said driven and third members to disengage the same from said driving member and abutment respectively, said third and driven members having companion outward flanges, and said actuating means comprising a lever movable transversely of said shaft and formed with walls alongside said flanges, said walls having cams effective when said lever is moved to gather said flanges.

3. A clutch, comprising a rotatable driving shaft, a driving clutch member carried by said shaft, a driven clutch member movable into and out of operative engagement with said driving member, an abutment on said shaft, a third member slidable on said shaft between said abutment and driving member, said third member slidably mounting said driven member, means normally effective to urge said driven and third members in opposite directions and into engagement with said driving member and abutment respectively, and actuating means to gather said driven and third members to disengage the same from said driving member and abutment respectively, said third and driven members having companion outward flanges, a support, said actuating means comprising a lever pivoted to said support and swingable transversely of said shaft and formed with walls alongside said flanges, said walls having cams effective when said lever is moved to gather said flanges.

4. A clutch, comprising a rotatable driving shaft, a driving clutch member carried by said shaft, a driven clutch member movable into and out of operative engagement with said driving member, an abutment on said shaft, a third member slidable on said shaft between said abutment and driving member, said third member slidably mounting said driven member, means normally effective to urge said driven and third members in opposite directions and into engagement with said driving member and abutment respectively, and actuating means to gather said driven and third members to disengage the same from said driving member and abutment respectively, said third and driven members having companion circular flanges, a support, said actuating means comprising a lever pivoted to said support to swing in a plane transversely of said shaft and having a pouch-like shank spaced from the latter and substantially conforming with the contour of said flanges, said shank being channeled with walls alongside said flanges, and such walls having cams effective when said lever is swung toward said shaft to gather said flanges.

5. A clutch, comprising a rotatable driving shaft, a driving clutch member carried by said shaft, a driven clutch member movable into and out of operative engagement with said driving member, an abutment on said shaft, a third member slidable on said shaft between said abutment and driving member, said third member slidably mounting said driven member, means normally effective to urge said driven and third members in opposite directions and into engagement with said driving member and abutment respectively, and actuating means to gather said driven and third members to disengage the same from said driving member and abutment respectively, the third and driven members having companion circular flanges, a support, said actuating means comprising a lever pivoted to the support to swing in a plane transversely of the shaft and having a pouch-like shank spaced from the latter and substantially conforming with the contours of the flanges, said shank being channeled with walls alongside said flanges, such walls having cams effective when the lever is swung toward the shaft to gather said flanges, and a stop carried by said support to limit the retraction of said lever for the release of said flanges.

6. A clutch comprising a shaft, a clutch member carried by said shaft, an abutment on said shaft in spaced relationship to said clutch member, a bushing slidable on said shaft into and out of engagement with said abutment, a second clutch member slidable on said bushing into and out of operative engagement with said first clutch member, means for simultaneously moving both said bushing and said second clutch member into engagement with said abutment and first clutch member respectively, and a control free of said bushing and said second clutch member for drawing both said bushing and said second clutch member out of engagement with said abutment and first clutch member respectively.

7. The structure of claim 6, said last named means including a pair of cams, one cam being engageable with said bushing and the other cam being engageable with said second clutch member respectively.

8. The structure of claim 6, said second clutch member and said bushing being recessed in their contiguous surfaces from opposite ends to form an annular integral cavity closed at both ends, and said first means comprising a compression spring seated in said cavity.

9. The structure of claim 6, said second clutch member and said bushing being recessed in their contiguous surfaces from opposite ends to form an annular internal cavity closed at both ends, said first means comprising a compression spring seated in said cavity, and said last named means including a pair of cams, one cam being engageable with said bushing and the other cam being engageable with said second clutch member respectively.

10. The structure of claim 6, said last named means comprising a lever movable relative to said shaft, a pair of cam formations on said lever, one cam formation being engageable with one end of said bushing and the other with the second clutch member.

11. The structure of claim 6, said second clutch member and said bushing being recessed in their contiguous surfaces from opposite ends to form an annular internal cavity closed at both ends, said first means comprising a compression spring seated in said cavity, said last named means comprising a lever movable relative to said shaft, and a pair of cam formations on said lever, each cam formation being engageable with one of said bushing and second clutch member.

ROBERT L. BROWNLEE.